United States Patent [19]

Naylor

[11] 4,277,591
[45] Jul. 7, 1981

[54] PROCESS FOR PRODUCING RANDOM COPOLYMERS OF CONJUGATED DIENES AND ALPHA-METHYLSTYRENE TYPE MONOMERS

[75] Inventor: Floyd E. Naylor, Bartlesville, Okla.

[73] Assignee: Phillips Petroleum Company, Bartlesville, Okla.

[21] Appl. No.: 96,108

[22] Filed: Nov. 20, 1979

[51] Int. Cl.³ .................................................. C08F 4/56
[52] U.S. Cl. ..................................... 526/174; 526/340
[58] Field of Search ........................................... 525/174

[56] References Cited

U.S. PATENT DOCUMENTS

| | | |
|---|---|---|
| 3,294,768 | 12/1966 | Wofford . |
| 3,366,611 | 1/1968 | Wofford . |
| 3,496,154 | 2/1970 | Wofford . |
| 3,726,844 | 4/1973 | Halasa .................................. 526/174 |
| 3,734,898 | 5/1973 | Komatsu et al. . |
| 3,759,919 | 9/1973 | Dillenschneider ................... 526/174 |
| 3,763,126 | 10/1973 | Farrar .................................. 526/174 |
| 3,767,632 | 10/1973 | Halasa ................................. 526/174 |
| 3,825,623 | 7/1974 | La Flair . |
| 3,992,561 | 11/1976 | Hargls et al. . |

*Primary Examiner*—William F. Hamrock

[57] ABSTRACT

Random copolymers of at least one conjugated diene and at least one alpha-methylstyrene type monomer are produced by solution polymerization in the presence of an organolithium initiator and at least one of selected sodium, potassium, rubidium, and cesium compounds.

26 Claims, No Drawings

PROCESS FOR PRODUCING RANDOM COPOLYMERS OF CONJUGATED DIENES AND ALPHA-METHYLSTYRENE TYPE MONOMERS

FIELD OF THE INVENTION

This invention relates to random copolymers of alpha-methylstyrene type monomers and conjugated diene type monomers. In another aspect, the invention relates to a process for copolymerizing alpha-methylstyrene type monomers and conjugated diene type monomers.

BACKGROUND OF THE INVENTION

Block copolymers prepared from a conjugated diene and styrene suffer from the drawback that they lack good elastomeric properties at elevated temperatures. This is a serious deficiency in view of the expanding need for synthetic rubbers that can be utilized at high temperatures, as for example, hoses, belts, and gaskets used under the hood of an automobile. Previously, it has been demonstrated that block copolymers capable of withstanding higher temperatures can be obtained if the non-elastomeric polystyrene blocks are replaced with blocks of poly(alpha-methylstyrene). See U.S. Pat. No. 3,825,623.

Although U.S. Pat No. 3,294,768 contains broad teachings in regard to forming random copolymers of conjugated dienes and certain monovinylarenes, that patent in column 5, lines 7–10, indicates that the process is not applicable to monovinylarenes having a substituent on the alpha carbon atom.

An object of the present invention is to provide a method for producing random copolymers of conjugated dienes and alpha-methylstyrenes.

A further object of the present invention is to provide copolymers of conjugated dienes and alpha-methylstyrenes.

Still another object of this invention is to provide copolymers of conjugated dienes and alpha-methylstyrene that have unexpectedly broad molecular weight distribution.

Other aspects, objects, and advantages of the present invention will be apparent from the following description and examples.

In accordance with the present invention, random copolymers of at least one conjugated diene and at least one alpha-methylstyrene type monomer are produced by the solution polymerization of those monomers in the presence of an organolithium initiator and at least one of selected alkali metal organic compounds.

MONOMERS

Alpha-methylstyrene is the presently preferred monovinylarene monomer due to its availability and relatively favorable economics. However, alpha-methylstyrene-type monomers broadly are useful and operable. Typically, these have from 9 to 24 carbon atoms per molecule and are of the formula

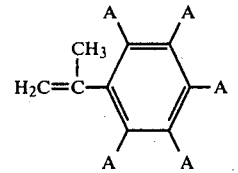

wherein each A is individually selected from the group consisting of hydrogen or alkyl, cycloalkyl, or aryl radicals, each having 1 to 8 carbon atoms.

Non-limiting examples include: alpha-methyl-4-butylstyrene, alpha-methyl-3,5-di-t-butylstyrene, alpha-methyl-3,4,5-trimethylstyrene, alpha-methyl-4-benzylstyrene, alpha-methyl-4-cyclohexylstyrene, and the like, alone, or mixtures. Furthermore, mixtures of alpha-methylstyrenes and styrene or ring substituted styrenes may also be used in this invention. Preferably, at least 5 weight percent of the total monomers are of the alpha-methylstyrene type.

Conjugated dienes having 4 to 12 carbon atoms per molecule are suitable for use in this invention, such as for example, 1,3-butadiene, isoprene, 2,3-dimethylbutadiene, 2-methyl-1,3-pentadiene, 2,3-dimethyl-1,3-pentadiene, 2-methyl-3-ethyl-1,3-pentadiene, 2-phenyl-1,3-butadiene, and the like. The presently preferred conjugated diene is 1,3-butadiene due to availability and favorable economics.

The relative amounts of conjugated diene or dienes and monovinylarene or arenes to be employed for the preparation of the random copolymers of this invention can vary over a wide range. In preparing rubbery copolymers, the proportion of the conjugated diene versus the monovinylarene should be sufficient so as to result in a substantially rubbery or elastomeric copolymer product. There is no sharp point as to the amount of conjugated diene versus monovinylarene that confers rubber or elastomeric properties on the resulting copolymer, though in general at least about 50 percent by weight of conjugated diene is required on an exemplary basis. Thus for a rubbery copolymer, the weight ratio of conjugated diene to monovinylarene would generally be in the range of about 50:50 to about 95:5.

ORGANOLITHIUM INITIATORS

Organolithium initiators employed in this invention include the monofunctional and multifunctional types known in the art for solution polymerization of the monomers described hereinabove. The multifunctional organolithium initiators can be either specific organolithium compounds, or can be multifunctional types which are not necessarily specific compounds but rather represent reproducible compositions of regulable functionality.

Organolithium compounds having the general formula $R(Li)_x$ wherein R represents a hydrocarbyl radical of such as 1 to 20 carbon atoms per radical, and x is an integer of 1 to 10, inclusive, more preferably 1 to 4. Exemplary organolithium compounds corresponding to this general formula include methyllithium, isopropyllithium, n-butyllithium, sec-butyllithium, t-octyllithium, n-decyllithium, phenyllithium, 1-naphthyllithium, 4-butylphenyllithium, cyclohexyllithium, 4-cyclohexylbutyllithium, dilithiomethane, 1,4-dilithiobutane, 1,10-dilithiodecane, 1,4-dilithiocyclohexane, 1,4-dilithio-2-butane, 1,8-dilithio-3-decane, 1,2-dilithio-1,8-diphenyloctane, 1,4-dilithiobenzene, 1,3,5-trilithiopentane, 1,5,15-trilithioeicosane, 1,3,5-trilithiocyclohexane, 1,3,5,8-tetralithiodecane, 1,5,10,20-tetralithioeicosane, and the like.

Other suitable multifunctional organolithium polymerization initiation agents can be prepared by utilizing an organomonolithium compound, further together with a multivinylarene. Furthermore, an organolithium compound can be allowed to react with a multivinylarene and either a conjugated diene or monovinylarene or both. These multifunctional initiators are typically prepared by initially charging all ingredients and allowing them to react in the presence of a hydrocarbon or a mixture of a hydrocarbon and a polar organic compound as diluent. Alternatively, a multifunctional polymerization initiator can be prepared in a two-step process by reacting an organolithium compound with a conjugated diene or monovinylarene and then adding the multivinylarene. Any of the conjugated dienes described previously can be employed for preparing these initiators. Examples of suitable monovinylarenes include styrene, 3-methylenestyrene, 4-propylstyrene, 4-cyclohexylstyrene, 2-ethyl-4-benzylstyrene, and the like. Exemplary, multivinylarenes include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, 1,3-divinyl-4,5,8-tributylnaphthalene, and the like. Divinyl aromatic hydrocarbons containing up to about 18 carbon atoms per molecule are preferred, particularly divinylbenzene as either the ortho, meta, or para isomer. Commercial divinylbenzene, which is a mixture of the three isomers and other compounds such as the ethylstyrenes, also is quite satisfactory.

The amount of organolithium initiator to be used depends upon the desired molecular weight of the copolymer, but is normally in the range of about 0.1 to about 100 milliequivalents, more preferably from 0.2 to about 5 milliequivalents, of lithium per 100 grams of total monomers.

ALKALI METAL ORGANIC COMPOUND

The random copolymers of this invention are prepared by organolithium initiation in the presence of an organic compound of sodium, potassium, rubidium, or cesium. These compounds are selected from the group consisting of compounds having the following formulas:

R'M (1)
R'(YM)$_n$ (2)

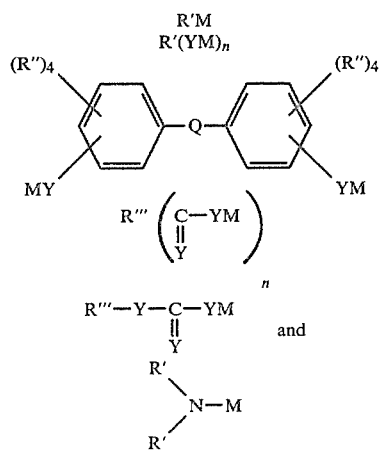

R'''—Y—C—YM (5)
 ‖
 Y
and
$\begin{matrix} R' \\ \diagdown \\ N-M \\ \diagup \\ R' \end{matrix}$ (6)

wherein R' is selected from the group consisting of aliphatic, cycloaliphatic and aromatic radicals, preferably containing from 1 to 20 carbon atoms, M is an alkali metal selected from the group consisting of sodium, potassium, rubidium and cesium, R'' is selected from the group consisting of hydrogen and aliphatic, cycloaliphatic and aromatic radicals, preferably containing from 1 to 6 carbon atoms, Q is selected from the group consisting of

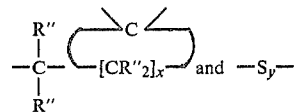

radicals, where R'' is as defined before, x is an integer from 4 to 5, inclusive, and y is an integer from 1 to 3, inclusive, R''' is selected from the group consisting of aliphatic, cycloaliphatic and aromatic radicals, preferably containing from 4 to 20 carbon atoms, Y is selected from the group consisting of oxygen and sulfur and n is an integer from 1 to 3, inclusive. It is to be understood that the aliphatic and cycloaliphatic radicals mentioned above can be saturated or unsaturated.

Examples of organometal compounds corresponding to Formula I include the following: methylsodium, ethylpotassium, n-propylrubidium, isopropylcesium, tert-butylsodium, tert-amylsodium, n-hexylpotassium, cyclohexylrubidium, eicosylcesium, 4-methylcyclohexylsodium, 3-hexenylsodium, 2,5-decadienylpotassium, 3-cyclopentenylrubidium, 4,6-di-n-butyldecylsodium, 3,6-diphenyloctylpotassium, phenylsodium, 1-naphthylpotassium, 4-tolylpotassium, benzylsodium, 4-tert-butyl-6,7-diisopropyl-2-naphthylpotassium, and the like.

Formula 2 and 3 define the alkali metal salts of mono- and polyhydric alcohols, mono- and polyhydric phenols, including bisphenols, and sulfur analogs of the foregoing, that can be used in preparing the present randomizing system. Specific examples of compound represented by Formula 2 include the sodium, potassium, rubidium and cesium salts of methyl alcohol, ethyl alcohol, n-propyl alcohol, isopropyl alcohol, tert-butyl alcohol, tert-amyl alcohol, n-hexyl alcohol, cyclohexyl alcohol, eicosyl alcohol, 2-butenyl alcohol, 4-methylcyclohexyl alcohol, 3-hexenyl alcohol, 2,5-decadienyl alcohol, 3-cyclopentenyl alcohol, 4,6-di-n-butyldecyl alcohol, 4,8-dodecadienyl alcohol, allyl alcohol, 1,3-dihydroxyhexane, 1,5,9-trihydroxytridecane, 1,6-dihydroxyoctane, 1,9,15-trihydroxypentadecane, benzyl alcohol, 3-(4-tolyl)propyl alcohol, phenol, catechol, resorcinol, hydroquinone, pyrogallol, 1-naphthol, 2-naphthol, 2,6-di-tert-butyl-4-methylphenol (Ionol), 2,4,6-tri-tert-butylphenol, 2,6-di-tert-butyl-4-phenylphenol, 2,6-di-sec-butyl-4-methylphenol, ethanethiol, 1-butanethiol, 2-pentanethiol, 2-butanethiol, benzenethiol (thiophenol), 1,12-dodecanedithiol, 5,9-di-n-propyl-1,14-tetradecanedithiol, 2-naphthalenethiol, cyclohexanethiol, 2,5-di-n-hexyl-6-tert-butylbenzenethiol, 2,6-di-tert-butyl-4-(4-tolyl)benzenethiol, 3-methylcyclohexanethiol, 2-naphthalenethiol, benzenemethanethiol, 2-naphthalenemethanethiol, 1,8-octanedithiol, 1,10-decanedithiol, 1,4-benzenedithiol, and the like. Specific examples of suitable compounds corresponding to Formula 3 are the sodium, potassium, rubidium and cesium salts of 2,2'-methylene-bis(4-methyl-6-tert-butylphenol), 2,2'-isopropylidene-bis(6-cyclohexyl-p-cresol), 4,4'-isopropylidene-bis(2,6-dicyclohexylphenol), 4,4'-methylene-bis(2,6-diisopropylphenol), 2,2'-methylene-bis(6-benzyl-p-cresol), 2,2'-ethylidene-bis(5-isopropylphenol), 1,1-bis(4-hydroxyphenyl)cyclohexane, 1,1-bis[2-hydroxy-3-(3-tolyl)]cyclopentane, 2,2'-ethylidene-bis(4-ethyl-6-tert-hexylthiophenol), 2,2'-propylidene-bis(3,5-dimethyl-6-cyclopentylthiophenol), 4,4'-thio-bis(2,6-di-tert-butylphenol), 4,4'-dithio-bis(2-n-propyl-6-tert-butylphenol), 4,4'-trithio-bis(2-methyl-6-isopropylphenol), and the like.

Specific examples of the alkali metal salts of mono- and poly-carboxy acids and sulfur analogs as represented by Formula 4 include the sodium, potassium, rubidium and cesium salts of isovaleric acid, caprylic acid, lauric acid, myristic acid, palmitic acid, stearic acid, arachidic acid, oleic acid, ricinoleic acid, linoleic acid, linolenic acid, gadoleic acid, cyclopentanecarboxylic acid, dimethylcyclohexane-3,5-dicarboxylic acid, phenylacetic acid, benzoic acid, pimelic acid, azelaic acid, sebacic acid, phthalic acid, hendecane-1,11-dioic acid, 1,8,16-hexadecanetricarboxylic acid, 3,3,7,7-tetramethylnonane-1,5,9-tricarboxylic acid, 4-pentyl-2,5-heptadiene-1,7-dioic acid, 2-naphthoic acid, 1-naphthaleneacrylic acid, hexane thionic acid, 2,2-diethylbutanethiolic acid, decanethionic acid, tridecane thionothiolic acid, 4-tetradecanethionic acid, thiolbenzoic acid, thiono-1-naphtholic acid, and the like.

Specific examples of alkali metal carbonates and sulfur analogs as represented by Formula 5 include the sodium, potassium, rubidium and cesium salts of tert-butylcarbonic acid, n-hexylcarbonic acid, 3,5-dimethylhexylcarbonic acid, n-dodecylcarbonic acid, 4,4-diethylhexylcarbonic acid, 3,6-diphenyloctylcarbonic acid, 7-dodecenylcarbonic acid, 3-cyclohexenylcarbonic acid, phenylcarbonic acid, O-tert-amyl ester of thiolcarbonic acid, O-tridecylester of thionocarbonic acid, O-eicosyl ester of thionothiocarbonic acid (xanthic acid), S-hexadecyl ester of dithiolcarbonic acid, S-(3-cyclohexenyl) ester of thiolcarbonic acid, phenyl ester of trithiocarbonic acid, and the like.

Specific examples of alkali metal salts of secondary amines as represented by Formula 6 include the sodium, potassium, rubidium and cesium salts of dimethylamine, di-n-butylamine, methyl-n-hexylamine, di(3,5-diethyloctyl)amine, di(8-phenyloctyl)amine, di(3-hexenyl)amine, diphenylamine, dibenzylamine, ethyl-4-tolylamine, n-propyl-n-eicosylamine, and the like.

It is to be understood that any one or more of the organic compounds of sodium, potassium, rubidium and cesium as represented by the formulas can be used with one or more of the $R(Li)_x$ compounds in forming the present randomizing system. Alkali metal derivatives of compounds having mixed functionality can also be employed with the $R(Li)_x$ compounds. Examples of such derivatives include the sodium, potassium, rubidium and cesium salts of 10-hydroxydecanoic acid, 8-mercapto-1-naphtholic acid, 1-hydroxy-14-mercapto-8-tetradecene, 1-hydroxy-9-mercaptopentadecanoic acid, 2-tert-butyl-6-mercapto-1-naphtholic acid, and the like.

The amount of organic compounds of sodium, potassium, rubidium, and cesium to be used can vary over a wide range. Only a small amount of the organic compound of sodium, potassium, rubidium or cesium is required to produce a completely random copolymer of a conjugated diene and a monovinylarene. Typically, the alkali metal organic compound is used in such an amount that the molar ratio of its alkali metal to lithium is in the range of about 0.05:1 to about 10:1. However, for obtaining a copolymer having a broader molecular weight distribution, the molar ratio of sodium, potassium, rubidium, or cesium:lithium should be greater than 0.5:1 and generally not be greater than 5:1.

DILUENTS

Polymerization is conducted by contacting the monomer charge with the organolithium initiator and the sodium, potassium, rubidium or cesium organic compound in a suitable diluent. Suitable diluents include any of the paraffinic, cycloparaffinic, or aromatic hydrocarbons known in the art, used alone or in admixture, typically of about 4 to about 10 carbon atoms per molecule. Exemplary species include such as n-hexane, n-heptane, 2,2,4-trimethylpentane, cyclohexane, cyclopentane, benzene, toluene, the xylenes, and the like. Cyclohexane currently is preferred for ease of handling, high solubility of polymer, and availability. The amount of diluent employed is usually in the range of 200 to 2000 parts by weight per 100 parts by weight of total monomers, with 300 to 1500 parts being a preferred range.

POLYMER COUPLING

If desired, the live random copolymer can be coupled. The term coupling as herein employed is a broad generic term meaning the bridging together and joining by means of central coupling atoms or coupling moiety, two or more of the living alkali metal terminated polymer chains.

A wide variety of agents suitable for such purposes are known in the art, non-limiting examples including the multivinylaromatic compounds, multiepoxides, multiisocyanates, multiimines, multialdehydes, multiketones, multianhydrides, multiesters, multihalides, compounds containing more than one type of functional group capable of reacting with live polymer molecules, and mixtures of more than one type or kind of coupling agent. Any method of adding the coupling agent known in the art is suitable. The amount of coupling agent to be added is left to the discretion of those skilled in the art since specific end-use and process requirements allow and/or necessitate a wide range of amount of coupling agent to be employed.

POLYMERIZATION CONDITIONS

The random copolymers of this invention can be prepared by a batch process utilizing any suitable charging procedure, e.g., charging the monomeric material into a reactor containing the organolithium initiator, the sodium, potassium, rubidium or cesium organic compound, and the diluent. In another method, the organolithium initiator and the sodium, potassium, rubidium, or cesium organic compound are charged separately to the reactor, either prior to or subsequent to the addition of the monomeric material and/or the diluent. It is also within the scope of this invention to premix the organolithium initiator and the sodium, potassium, rubidium or cesium organic compound in a liquid hydrocarbon, preferably the same as the polymerization diluent, and the mixture charged to the reactor. It is also frequently advantageous to age the mixture of the organolithium initiator and the sodium, potassium, rubidium or cesium organic compound, particularly when the second component is not readily soluble in the liquid hydrocarbon. In such cases, optimum results are obtained by aging the mixture at a temperature in the range of about 25° C. to about 150° C. The aging time depends upon the temperature used and the solubility of the second component, but is usually in the range of about 5 minutes to about 10 minutes, although in many instances the aging time can range from about 1 to about 100 hours, and times as long as 6 to 8 months can be utilized. The polymerization can also be practiced in a continuous manner by maintaining the above-described concentration of reactants in the reactor for a suitable residence time. The residence time in the continuous process will, of course, vary within rather wide limits depending upon such variables as reaction temperature, pressure, the amount of catalyst used and the monomeric materials being polymerized. In a continuous process the residence time generally falls within the range of 1 second to 1 hour when conditions within the specified ranges are employed. When a batch process is being utilized, the time for the reaction can be as high as 24 hours or more although it is generally less than 24 hours.

The polymerization process of this invention can be carried out at any temperature within the range of about $-80°$ to $150°$ C., but it is preferred to operate in the range of $0°$ to $120°$ C. The polymerization reaction can be carried out under autogenous pressures. It is usually desirable to operate at pressure sufficient to maintain the monomeric materials substantially in the liquid phase. The pressure will thus depend upon the particular materials being polymerized, the diluent employed, and the temperature at which the polymerization is carried out. However, higher pressures can be employed, if desired, these pressures being obtained by some such suitable method as the pressurization of the reactor with a gas which is inert with respect to the polymerization reaction.

The random copolymer of this invention can be prepared in the presence of a separate, additional polar material which promotes the formation of pendent vinyl groups and which further activates the polymerization initiator. Suitable polar materials are those which do not contain an active hydrogen, but may contain oxygen, sulfur, and nitrogen. Suitable polar compounds include ethers, thioethers, tertiary amines, and the like. It is preferred that these polar compounds have a dielectric constant of between about 2 and about 9. Preferable polar compounds are aliphatic or cyclic ethers, such as dimethyl ether, diethyl ether, diamyl ether, dimethoxyethane, bis(2-ethoxyethyl) ether, and tetrahydrofuran. The polar compound, when used, is normally added to the polymerization mixture in the amount of 0.05 to 10 parts by weight per 100 parts by weight of total monomers, more preferably 0.05 to 5 parts.

Upon completion of the polymerization period, the reaction mixture is treated in order to inactivate the initiator system and recover the polymer. It is generally preferred to add only an amount of deactivating material, such as water or an alcohol, which is sufficient to deactivate the initiator system without causing precipitation of the dissolved polymer. It has also been found to be advantageous to add an antioxidant, such as phenyl-beta-naphthylamine or 2,6-di-t-butyl-4-methylphenol, to the polymer solution prior to precipitation of the polymer. After addition of the deactivating agent and the antioxidant, the polymer present in the solution can then be precipitated by the addition of an excess of a material such as ethyl alcohol or isopropyl alcohol or by steam stripping. It is to be understood, however, that deactivation of the initiator system and precipitation of the polymer can be accomplished in a single step. The precipitated polymer can then be recovered by filtration, decantation, and the like. In order to purify the polymer, the separated polymer can be redissolved in a suitable solvent and again precipitated by addition of an alcohol. Thereafter, the polymer is again recovered by separation steps, as indicated hereinbefore, and dried. Any suitable hydrocarbon solvent, such as mentioned hereinbefore, can be used in this purification step to redissolve the polymer. The diluent and alcohol can be separated, for example, by fractional distillation, and reused in the process.

As mentioned before, it is within the scope of the invention to utilize an antioxidant. The antioxidant can be added to the reaction mixture prior to precipitation of the polymer, to the solution of redissolved polymer or to the diluent in which the polymer is to be subsequently dissolved.

The rubbery polymers produced in accordance with this invention have utility in applications where synthetic and natural rubbers are used. The polymers can be compounded by any of the known methods as have been used in the past for compounding rubbers. Compounding ingredients, such as fillers, dyes, pigments, curing or cross-linking agents, softeners, reinforcing agents, and the like, can be used in the compounding operation. In manufacturing finished articles, the rubbery polymers can be molded or extruded. They can be advantageously employed in the manufacture of items such as automobile tires, gaskets, containers, pipes, hoses, and the like.

EXAMPLE I

This example illustrates the effect of potassium t-amyloxide on alpha-methylstyrene conversion to polymer in the n-butyllithium initiated, random copolymerization of butadiene and alpha-methylstyrene.

A series of random polymerization was carried out using a range of potassium t-amyloxide concentrations. As a control, one run was made without added potassium t-amyloxide. The polymers were prepared according to Recipe I.

| Recipe I | |
|---|---|
| Cyclohexane, parts by weight | 780 |
| 1,3-Butadiene, parts by weight | 75 |
| Alpha-methylstyrene, parts by weight | 25 |
| n-Butyllithium, mhm$^a$ | 1.2 |
| Potassium t-amyloxide, mhm$^a$ | variable |
| Tetrahydrofuran, mhm$^a$ | variable |
| Polymerization temperature, °C. | 70 |
| Polymerization time, hours | 1.5 |

$^a$mhm = Gram millimoles per 100 grams of total monomers.

Polymerizations were carried ot in 26 ounce (about 780 ml) beverage bottles equipped with perforated Crown caps over self-sealing rubber gaskets. The charge order to the bottles was: cyclohexane, nitrogen purge, tetrahydrofuran, potassium t-amyloxide, alpha-methylstyrene, n-butyllithium, 1,3-butadiene. Following completion of polymerization, the live polymer was terminated by adding one phm (parts per 100 parts of total monomers) of a 10% (weight/volume) solution of 2,6-di-t-butyl-4-methylphenol in a 50/50 (by volume) toluene/isopropyl alcohol. The terminated polymer was coagulated with excess isopropyl alcohol and recovered by filtration. The recovered polymer was dried for about 15 hours at about 50° to 60° C. under reduced pressure.

The influence of potassium t-amyloxide on the conversion of alpha-methylstyrene to polymer in the preparation of butadiene/alpha-methylstyrene random copolymers is shown in Table I.

TABLE I

Influence of Potassium t-Amyloxide on Alpha-methylstyrene Conversion to Polymer

| KTA,[a] mhm | THF,[b] mhm | Alpha-methylstyrene Conv., Weight Percent[c] |
|---|---|---|
| 0.9 | 0 | 54 |
| 1.0 | 0 | 56 |
| 1.1 | 0 | 60 |
| 1.2 | 0 | 65 |
| 0 | 23.6 | 1 |
| 0.9 | 23.6 | 51 |
| 1.0 | 23.6 | 62 |
| 1.1 | 23.6 | 64 |
| 1.2 | 23.6 | 65 |
| 1.0 | 11.1 | 62 |
| 1.1 | 11.1 | 65 |

[a]KTA = Potassium t-amyloxide.
[b]THF = Tetrahydrofuran.
[c]Determined from weight of polymer produced and assumption that conversion of 1,3-butadiene to polymer was quantitative.

These data illustrate that random butadiene/alpha-methylstyrene copolymer can be prepared with satisfactory conversion of alpha-methylstyrene to polymer when polymerization is conducted in the presence of potassium t-amyloxide. In the absence of potassium t-amyloxide, essentially none of the alpha-methylstyrene is polymerized. The presence of tetrahydrofuran has no evident influence on the conversion of alpha-methylstyrene to polymer.

EXAMPLE II

This example illustrates the influence of the potassium t-amyloxide/n-butyllithium molar ratio on the molecular weight distribution of butadiene/alpha-methylstyrene and butadiene/styrene random block copolymers.

A series of butadiene/alpha-methylstyrene and butadiene/styrene random block copolymers was prepared according to the general procedure described in Example I. The molecular weight distribution (as described by the heterogeneity index) of these copolymers as a function of the potassium t-amyloxide/n-butyllithium molar ratio, i.e., the potassium/lithium molar ratio, is shown in Table II.

TABLE II

Influence of Potassium t-Amyloxide/n-Butyllithium Molar Ratio on Molecular Weight Distributions of Butadiene/Alpha-methylstyrene Copolymers and Butadiene/Styrene Copolymers

| Monomers | KTA, mhm | NBL,[a] mhm | K/Li[b] | Molecular Weight[c] $M_w$ | $M_n$ | H.I.[d] |
|---|---|---|---|---|---|---|
| 70/30 Bd/Sty | 0.4 | 0.8 | 0.50 | 116,000 | 99,000 | 1.17 |
| 70/30 Bd/Sty | 0.6 | 0.8 | 0.75 | 125,000 | 107,000 | 1.17 |
| 70/30 Bd/Sty | 0.8 | 0.8 | 1.00 | 132,000 | 113,000 | 1.17 |
| 70/30 Bd/Sty | 1.0 | 0.8 | 1.25 | 128,000 | 121,000 | 1.06 |
| 70/30 Bd/Sty | 1.4 | 0.8 | 1.75 | 155,000 | 96,000 | 1.61 |
| 70/30 Bd/Sty | 1.6 | 0.8 | 2.00 | 167,000 | 67,000 | 2.49 |
| 70/30 Bd/Sty | 1.8 | 0.8 | 2.25 | 177,000 | 59,000 | 3.00 |
| 70/30 Bd/Alpha-MS | 0.6 | 0.8 | 0.75 | 188,000 | 81,000 | 2.32 |
| 70/30 Bd/Alpha-MS | 0.8 | 0.8 | 1.00 | 238,000 | 100,000 | 2.38 |
| 70/30 Bd/Alpha-MS | 1.0 | 0.8 | 1.25 | 281,000 | 106,000 | 2.65 |
| 70/30 Bd/Alpha-MS | 1.2 | 0.8 | 1.50 | 351,000 | 90,000 | 3.90 |
| 65/35 Bd/Aplha-MS | 0.4 | 0.8 | 0.50 | 145,000 | 61,000 | 2.38 |
| 65/35 Bd/Alpha-MS | 0.8 | 0.8 | 1.00 | 292,000 | 81,000 | 3.60 |
| 65/35 Bd/Alpha-MS | 1.0 | 0.8 | 1.25 | 350,000 | 129,000 | 2.70 |
| 65/35 Bd/Alpha-MS | 1.4 | 0.8 | 1.75 | 406,000 | 87,000 | 4.67 |
| 60/40 Bd/Alpha-MS | 0.4 | 0.8 | 0.50 | 127,000 | 58,000 | 2.19 |
| 60/40 Bd/Alpha-MS | 0.6 | 0.8 | 0.75 | 164,000 | 73,000 | 2.25 |
| 60/40 Bd/Alpha-MS | 0.8 | 0.8 | 1.00 | 151,000 | 66,000 | 2.29 |
| 60/40 Bd/Alpha-MS | 1.0 | 0.8 | 1.25 | 267,000 | 107,000 | 2.50 |
| 60/40 Bd/Alpha-MS | 1.2 | 0.8 | 1.50 | 367,000 | 86,000 | 4.26 |
| 60/40 Bd/Alpha-MS | 1.4 | 0.8 | 1.75 | 391,000 | 72,000 | 5.43 |
| 50/50 Bd/Alpha-MS | 0.4 | 0.8 | 0.50 | 154,000 | 47,000 | 3.28 |
| 50/50 Bd/Alpha-MS | 0.6 | 0.8 | 0.75 | 142,000 | 48,000 | 2.96 |
| 50/50 Bd/Alpha-MS | 0.8 | 0.8 | 1.00 | 150,000 | 63,000 | 2.38 |
| 50/50 Bd/Alpha-MS | 1.0 | 0.8 | 1.25 | 199,000 | 63,000 | 3.16 |
| 50/50 Bd/Alpha-MS | 1.2 | 0.8 | 1.50 | 278,000 | 63,000 | 4.41 |
| 50/50 Bd/Alpha-MS | 1.4 | 0.8 | 1.75 | 336,000 | 62,000 | 5.42 |
| 40/60 Bd/Alpha-MS | 0.4 | 0.8 | 0.50 | 86,000 | 36,000 | 2.39 |
| 40/60 Bd/Alpha-MS | 0.6 | 0.8 | 0.75 | 106,000 | 44,000 | 2.41 |
| 40/60 Bd/Alpha-MS | 0.8 | 0.8 | 1.00 | 111,000 | 47,000 | 2.36 |
| 40/60 Bd/Alpha-MS | 1.0 | 0.8 | 1.25 | 135,000 | 49,000 | 2.76 |
| 40/60 Bd/Alpha-MS | 1.2 | 0.8 | 1.50 | 204,000 | 46,000 | 4.43 |
| 40/60 Bd/Alpha-MS | 1.4 | 0.8 | 1.75 | 321,000 | 52,000 | 6.17 |

[a]NBL = n-Butyllithium.
[b]K/Li = Potassium/lithium molar ratio.
[c]Molecular weights were determined from gel permeation chromatography curves by a procedure described by G. Kraus and C. J. Stacy, J. Poly. Sci. A-2 10, 657 (1972), and G. Kraus and C. J. Stacy, J. Poly. Sci. Symposium No. 43, 329 (1973).
[d]H.I. = Heterogeneity index = $M_w/M_n$. The higher the number, the broader the molecular weight distribution.

These data illustrate that broad molecular weight distribution can be achieved at much lower K/Li molar ratios for butadiene/alpha-methylstyrene random copolymers than for butadiene/styrene random copolymers.

EXAMPLE III

This example illustrates the preparation of butadiene/styrene/alpha-methylstyrene random terpolymers in the presence of potassium t-amyloxide.

A series of terpolymers was prepared according to the general procedures described in Example I and Recipe II.

| Recipe II | |
|---|---|
| Cyclohexane, parts by weight | 780 |
| 1,3-Butadiene, parts by weight | variable |
| Styrene, parts by weight | variable |
| Alpha-methylstyrene, parts by weight | variable |
| n-Butyllithium, mhm | 0.8 |
| Potassium t-amyloxide, mhm | 1.0 |
| Tetrahydrofuran, mhm | 23.6 |
| Polymerization temperature, °C. | 70 |
| Polymerization time, hours | 1 |

Conversion of alpha-methylstyrene to polymer and properties of the terpolymers prepared by this recipe are shown in Table III.

TABLE III

Conversion of Alpha-methylstyrene to Polymer and Properties of Butadiene/Styrene/Alpha-methylstyrene Terpolymers

| Recipe Parts By Weight | | | Alpha-Methylstyrene Conversion | Molecular Weight | | Inherent Viscosity[e] | Mooney Viscosity (ML-4 at 100° C.)[f] |
|---|---|---|---|---|---|---|---|
| Bd[a] | Sty[b] | MS[c] | Weight[d] | $M_w$ | $M_n$ | | |
| 80 | 10 | 10 | 58 | 405,000 | 195,000 | 1.73 | 60 |
| 70 | 15 | 15 | 65 | 414,000 | 174,000 | 1.65 | 65 |
| 60 | 20 | 20 | 54 | 436,000 | 194,000 | 1.52 | 64 |
| 50 | 25 | 25 | 58 | 343,000 | 158,000 | 1.31 | 59 |

[a]Bd = 1,3-Butadiene.
[b]Sty = Styrene.
[c]MS = Alpha-methylstyrene.
[d]Calculated value determined from weight of polymer produced and assumption that conversion of 1,3-butadiene and styrene to polymer was quantitative.
[e]Inherent viscosity was determined according to the procedure given in U.S. Pat. No. 3,278,508, column 20, Note a with the modification that the solution was not filtered through a sulfur absorption tube but rather a sample of the solution was filtered through a fritted glass filter stick of grade C porosity and pressured directly into the viscometer.
[f]ASTM D1644-74.

These data illustrate that random terpolymers of butadiene/styrene/alpha-methylstyrene prepared in the presence of potassium t-amyloxide have high molecular weight and that the conversion of alpha-methylstyrene to polymer is satisfactory.

What is claimd is:

1. A process for producing a random copolymer comprising contacting under solution polymerization conditions in a polymerization zone (1) a mixture of monomers comprising
at least one conjugated diene having 4 to 12 carbon atoms per molecule and
at least one alpha-methylstyrene type monomer having 9 to 24 carbon atoms and the formula

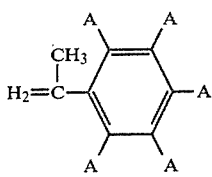

wherein each A is individually selected from the group consisting of hydrogen or alkyl, cycloalkyl, or aryl radicals having 1 to 8 carbon atoms, (2) an organolithium initiator, and (3) an effective amount of at least one alkali metal organic compound selected from those having the formulas:

R'M

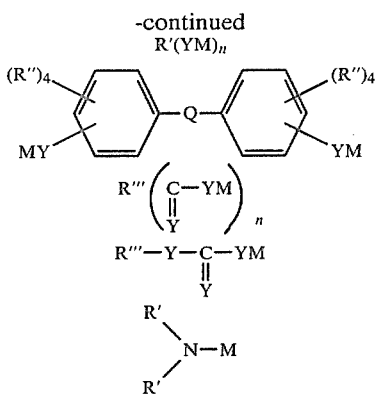

wherein R' is selected from the group consisting of aliphatic, cycloaliphatic, and aromatic radicals, M is an alkali metal selected from the group consisting of sodium, potassium, rubidium, and cesium, R" is selected from the group consisting of aliphatic, cycloaliphatic, and aromatic radicals, Q is selected from the group consisting of

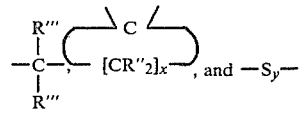

radicals wherein R" is as defined before, x is 4 or 5, and y is 1, 2, or 3, R'" is selected from the group consisting of aliphatic, cycloaliphatic, and aromatic radicals, Y is selected from the group consisting of oxygen and sulfur and n is 1, 2, or 3.

2. A process according to claim 1 wherein said solution polymerization conditions include a temperature in the range of about −80° C. to about 150° C.

3. A process according to claim 2 wherein each said alkali metal organic compound is selected from those in which each R' contains 1 to 20 carbon atoms, each R" contains 1 to 6 carbon atoms, and R'" contains 4 to 20 carbon atoms.

4. A process according to claim 3 wherein said conjugated diene is 1,3-butadiene.

5. A process according to claim 3 wherein said alpha-methylstyrene type monomer is alpha-methylstyrene.

6. A process according to claim 3 wherein said monomers include 1,3-butadiene and alpha-methylstyrene.

7. A process according to claim 6 wherein the weight ratio of 1,3-butadiene to alpha-methylstyrene is in the range of about 40:60 to about 95:5.

8. A process according to claim 7 wherein each said alkali metal organic compound is selected from the group consisting of those having the formula $R'(YM)_n$.

9. A process according to claim 8 wherein n is 1.

10. A process according to claim 9 wherein $R'$ is a tertiary alkyl radical and Y is oxygen.

11. A process according to claim 10 wherein said alkali metal organic compound is selected from alkali metal salts of tert-amyl alcohol.

12. A process according to claim 1 wherein said alkali metal organic compound is potassium t-amyloxide.

13. A process according to claim 12 wherein tetrahydrofuran is included in the polymerization mixture in an amount in the range of 0.05 to 10 parts by weight per 100 parts by weight of total monomers.

14. A process according to claim 13 wherein said organolithium initiator is n-butyllithium and said n-butyllithium is employed in an amount in the range of about 0.11 to about 100 milliequivalents per hundred grams of total monomer.

15. A process according to claim 14 wherein the molar ratio of potassium to lithium is greater than 1:1.

16. A process according to claim 14 wherein the molar ratio of potassium to lithium is in the range of about 0.5:1 to about 1.75:1.

17. A process according to claim 15, and 16 wherein the weight ratio of butadiene to alpha-methylstyrene is in the range of about 40:60 to about 70:30.

18. A process according to claim 12 wherein said organolithium initiator is n-butyllithium and said n-butyllithium is employed in an amount in the range of about 0.1 to about 100 milliequivalents per hundred grams of total monomer.

19. A process according to claim 15 wherein said monomers include styrene.

20. A process according to claim 19 wherein the weight ratios of 1,3-butadiene to alpha-methylstyrene to styrene is in the range of about 50:25:25 to about 80:10:10.

21. A process according to claim 20 wherein tetrahydrofuran is included in the polymerization mixture in an amount in the range of 0.05 to 10 parts by weight per 100 parts by weight of total monomers.

22. A process according to claim 21 wherein the molar ratio of potassium to lithium is greater than 1:1 but no greater than 5:1.

23. A process according to claim 11 wherein the solution polymerization conditions include a temperature in the range of about 0° C. to about 120° C. and the molar ratio of the alkali metal of said alkali metal organic compound to the lithium is in the range of about 0.5/1 to 5/1.

24. A process according to claim 17 conducted under such conditions that the random copolymer produced has a heterogeneity index in the range of about 2.3 to about 6.2.

25. A process according to claim 22 conducted under such conditions that the random copolymer produced has a heterogeneity index in the range of about 2.1 to 2.4.

26. A process according to claim 12 conducted under such conditions that the random copolymer has a heterogeneity index in the range of about 2.3 to 6.2.

* * * * *

UNITED STATES PATENT AND TRADEMARK OFFICE
CERTIFICATE OF CORRECTION

PATENT NO. : 4,277,591
DATED : July 7, 1981
INVENTOR(S) : Floyd E. Naylor

It is certified that error appears in the above—identified patent and that said Letters Patent are hereby corrected as shown below:

Column 13, line 15, delete "1" and substitute therefor --- 23 ---.

Column 13, line 24, delete "0.11" and substitute therefor --- 0.1 ---.

Signed and Sealed this

Twenty-fifth Day of January 1983

[SEAL]

Attest:

GERALD J. MOSSINGHOFF

Attesting Officer

Commissioner of Patents and Trademarks